(12) United States Patent
Denney et al.

(10) Patent No.: US 7,782,855 B2
(45) Date of Patent: *Aug. 24, 2010

(54) METHOD AND APPARATUS FOR THE REDUCTION OF UPSTREAM REQUEST PROCESSING LATENCY IN A CABLE MODEM TERMINATION SYSTEM

(75) Inventors: Lisa V. Denney, Suwanee, GA (US); Anders Hebsgaard, Duluth, GA (US); Robert J. Lee, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 1389 days.

This patent is subject to a terminal disclaimer.

(21) Appl. No.: 11/121,116

(22) Filed: May 4, 2005

(65) Prior Publication Data

US 2005/0190696 A1 Sep. 1, 2005

Related U.S. Application Data

(63) Continuation of application No. 09/652,718, filed on Aug. 31, 2000, now Pat. No. 6,909,715.

(60) Provisional application No. 60/151,665, filed on Aug. 31, 1999.

(51) Int. Cl.
*H04L 12/28* (2006.01)
(52) U.S. Cl. .................................. 370/392; 370/412
(58) Field of Classification Search .................. None
See application file for complete search history.

(56) References Cited

U.S. PATENT DOCUMENTS

| 5,448,559 | A | 9/1995 | Hayter et al. |
| 5,677,906 | A | 10/1997 | Hayter et al. |
| 6,298,049 | B1 | 10/2001 | Vanhoof et al. |
| 6,304,578 | B1 | 10/2001 | Fluss |

(Continued)

FOREIGN PATENT DOCUMENTS

| EP | 0 829 986 A1 | 3/1998 |
| WO | 99 61993 | 12/1999 |

OTHER PUBLICATIONS

Microsoft Corporation, "Quality of Service and DOCSIS Networks," Microsoft Website, Aug. 19, 1999, pp. 1-4.
International Search Report for International Application No. PCT/US00/24072, filed Aug. 31, 2000.

*Primary Examiner*—Phuc Tran
(74) *Attorney, Agent, or Firm*—Sterne, Kessler, Goldstein & Fox, PLLC.

(57) ABSTRACT

Upstream requests such a bandwidth requests, are processed by CMTS out of order on a priority basis to reduce latency in responding to the request. Specifically, a cable modem termination system (CMTS) is connected to a plurality of cable modems by a cable plant. The CMTS has a burst receiver adapted to be connected to the cable plant to process upstream data packet units and bandwidth requests transmitted by the cable modems. Each packet includes a header that uniquely distinguishes the bandwidth requests from other data types. Packet data units are arranged in a first memory queue. Bandwidth requests are arranged in a second memory queue. The headers of the packets processed by the burst receiver are inspected as they arrive at the CMTS to determine if the packets are packet data units or bandwidth requests. Packet data units are routed to the first memory queue. Bandwidth requests are routed to the second memory queue. Bandwidth allocation MAP messages are generated from the bandwidth requests stored in the second queue and transmitted downstream to the cable modems. The packet data units stored in the first queue are coupled to a data output for further distribution.

24 Claims, 5 Drawing Sheets

U.S. PATENT DOCUMENTS

| | | |
|---|---|---|
| 6,396,829 B1 | 5/2002 | Witschorik |
| 6,452,933 B1 | 9/2002 | Duffield et al. |
| 6,546,017 B1 * | 4/2003 | Khaunte .................... 370/412 |
| 6,584,071 B1 | 6/2003 | Kodialam et al. |
| 6,597,699 B1 | 7/2003 | Ayres |
| 6,650,624 B1 | 11/2003 | Quigley et al. |
| 6,760,316 B1 | 7/2004 | Hebsgaard et al. |
| 6,778,531 B1 | 8/2004 | Kodialam et al. |
| 6,785,564 B1 | 8/2004 | Quigley et al. |
| 6,788,707 B1 | 9/2004 | Horton, Jr. et al. |

* cited by examiner

METHOD AND APPARATUS FOR THE REDUCTION OF UPSTREAM REQUEST PROCESSING LATENCY IN A CABLE MODEM TERMINATION SYSTEM

CROSS-REFERENCE TO RELATED APPLICATION(S)

This application is a continuation of application Ser. No. 09/652,718, filed Aug. 31, 2000, now allowed, which is a nonprovisional of provisional application Ser. No. 60/151,665, filed Aug. 31, 1999, all of which are incorporated herein by reference.

BACKGROUND OF THE INVENTION

This invention relates to TDMA communication systems, and more particularly, to a method and apparatus for processing bandwidth requests in a cable modem termination system (CTMS).

A CMTS processes various types of upstream data it receives from cable modems attached to a hybrid fiber cable (HFC) plant. Included data types are protocol data units (PDU) and requests from the cable modems for bandwidth, i.e., time slots, to transmit packet data units upstream to the CMTS. Each data type is uniquely identified in a header transmitted as part of the data packets. Conventionally, a CTMS processes all the data types in the order of receipt, irrespective of the data type.

SUMMARY OF THE INVENTION

According to the invention, some data types, particularly bandwidth requests, are processed out of order on a priority basis to reduce latency in allocating bandwidth to requesting cable modems. Specifically, a cable modem termination system (CMTS) is connected to a plurality of cable modems by a cable plant. The CMTS has a burst receiver adapted to be connected to the cable plant to process upstream data packet units and bandwidth requests transmitted by the cable modems. Each packet includes a header that uniquely distinguishes the bandwidth requests from other data types.

Data packet units are arranged in a first memory queue. Bandwidth requests are arranged in a second memory queue. The headers of the packets processed by the burst receiver are inspected as they arrive at the CMTS to determine if the packets are data packet units or bandwidth requests. Data packet units are routed to the first memory queue. Bandwidth requests are routed to the second memory queue. Bandwidth allocation MAP messages are generated from the bandwidth requests stored in the second queue and transmitted downstream to the cable modems. The data packet units stored in the first queue are coupled to a data output for further distribution.

As a result, bandwidth requests can be processed out of order and ahead of the data packet units so as to reduce latency in the allocation of bandwidth to the cable modems.

DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENTS

Figure 1:
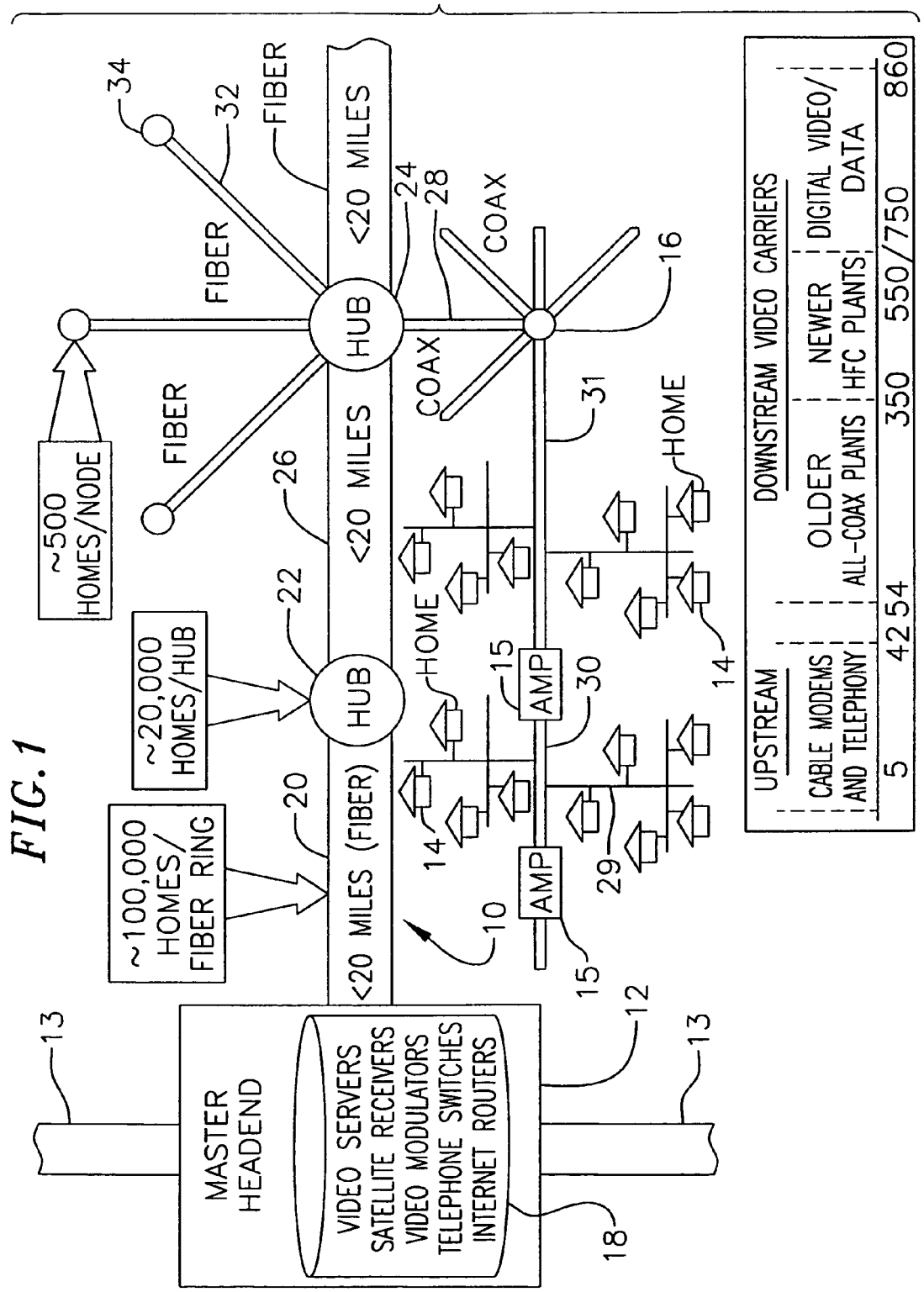
FIG. 1 is a schematic diagram of a cable transmission system including a headend with a cable modem termination system connected by a hybrid fiber coaxial (HFC) network to a plurality of cable modems.

The disclosure of patent application Ser. No. 09/574,558, filed on May 19, 2000 is incorporated fully herein by reference.

In a cable modem system, a headend or cable modem termination system (CMTS) is located at a cable company facility and functions as a modem which services a large number subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which effects communication with a plurality of cable modems. A typical cable modem termination system includes a burst receiver, a continuous transmitter and a medium access control (MAC).

The cable modem termination system communicates with the plurality of cable modems via a hybrid fiber coaxial (HFC) network, wherein optical fiber provides communication to a plurality of fiber nodes and each fiber node typically serves approximately 500 to 2,000 subscribers. These subscribers communicate with the node via a shared coaxial cable. It is this sharing of the common coaxial cable which necessitates that the number of cable modems attached thereto be limited so as to mitigate the likelihood of undesirable bit rate reductions which inherently occur when an excessive number of cable modems communicate simultaneously over a single coaxial cable.

The hybrid fiber coaxial network of a cable modem system utilizes a point-to-multipoint topology to carry out communication between the cable modem termination system and the plurality of cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for facilitating the transmission of data communications therefrom to the cable modems and an upstream demodulator for facilitating the reception of data communications from the cable modems.

Typically, the downstream modulator of the cable modem termination system utilizes either 64 QAM or 256 QAM in a frequency band of 54 MHz to 860 MHz to provide a data rate of up to 56 Mbps. Since the upstream channel has a much lower data rate requirement, the upstream demodulator typically uses either QPSK or 16 QAM in a frequency range of 5 MHz to 42 MHz to provide a data rate of up to 10 Mbps.

The asymmetric data throughput defined by the upstream channel requiring a much lower data rate than the downstream channel results from the inherently larger amount of data which is communicated via the downstream channel during pay-per-view, Internet access and the like, wherein a video signal is communicated via the downstream channel, while only control signals such as those associated with viewing of the video signal are communicated via the upstream channel. Thus, the downstream channel requirement may exceed 1.5 Mbps, while the upstream channel requirement may be as low as 16 Kbps.

In the future, it is expected that cable transmission in the upstream direction will become broader band, because digital television transmission requires less bandwidth than analog television transmission.

Each cable modem includes an upstream modulator for transmitting data to the cable modem termination system and a downstream demodulator for receiving data from the cable modem termination system. The upstream modulator of each cable modem uses either QPSK or 16 QAM within the 5 MHz to 42 MHz bandwidth of the upstream demodulator and the downstream demodulator of each cable modem utilizes either 64 QAM or 256 QAM in the 54 MHz to 860 MHz bandwidth of the downstream modulator (in North America).

Contemporary cable modem systems operate on a plurality of upstream channels and utilize time division multiple access (TDMA) in order to facilitate communication between a plurality of cable modems and a single cable modem termination system on each upstream channel. Typically, between 250 and 500 cable modems communicate with a single cable modem termination system on a given upstream channel.

In order to accomplish TDMA for upstream communication, it is necessary to assign time slots within which cable modems having a message to send to the cable modem termination system are allowed to transmit. The assignment of such time slots is accomplished by providing a request contention area in the upstream data path within which the cable modems are permitted to contend in order to place a message which requests additional time in the upstream data path for the transmission of their message. (Small data packets are sometimes also transmitted in contention regions.) The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Because of the use of TDMA, the cable modem termination system must use a burst receiver, rather than a continuous receiver, to receive data packets from cable modems via upstream communications. As those skilled in the art will appreciate, a continuous receiver can only be utilized where generally continuous communications (as opposed to burst communications as in the present invention) are performed, so as to substantially maintain timing synchronization between the transmitter and the receiver, as is necessary for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems require periodic and frequent reacquisition of the signal. That is, during TDMA communications, the signal must be reacquired for each separate burst transmission being received.

Since continuous receivers generally only acquire the signal once, the need to minimize acquisition time is much less critical in continuous receivers than in burst receivers, wherein acquisition must be performed for each separate burst, and therefore occurs quite frequently. Thus, there is a strong motivation to minimize acquisition time in burst receivers, so as to enhance overall data transmission efficiency and throughput. As such, it is beneficial to provide techniques which enhance the speed at which data packets transmitted according to TDMA methodologies may be acquired by a burst receiver, such as that of a cable modem termination system.

Referring now to FIG. 1, a hybrid fiber coaxial (HFC) network 10 transmits data between a headend 12, which includes at least one cable modem termination system, and a plurality of homes 14, each of which contains a cable modem. Such hybrid fiber coaxial networks are commonly utilized by cable providers to provide Internet access, cable television, pay-per-view and the like to subscribers.

Approximately 500 homes 14 are in electrical communication with each node 16, 34 of the hybrid fiber coaxial network 10, typically via coaxial cable 29, 30, 31. Amplifiers 15 facilitate the electrical connection of the more distant homes 14 to the nodes 16, 34 by boosting the strength of the electrical signals so as to desirably enhance the signal-to-noise ratio of such communications and by then transmitting the electrical signals over coaxial conductors 30, 31. Coaxial conductors 29 electrically interconnect the homes 14 with the coaxial conductors 30, 31, which extend between amplifiers 15 and nodes 16, 34.

Each node 16, 34 is electrically connected to a hub 22, 24, typically via an optical fiber 28, 32. The hubs 22, 24 are in communication with the headend 12, via optical fiber 20, 26. Each hub is typically capable communicating with approximately 20,000 of homes 14.

The optical fiber 20, 26 extending intermediate the headend 12 and each hub 22, 24 defines a fiber ring which is typically capable of communicating between approximately 100,000 of homes 14 and the headend 12.

The headend 12 may include video servers, satellite receivers, video modulators, telephone switches and/or Internet routers 18, as well as the cable modem termination system. The headend 12 communicates via transmission line 13, which may be a T1 or T2 line, with the Internet, other headends and/or any other desired device(s) or network.

Figure 2:
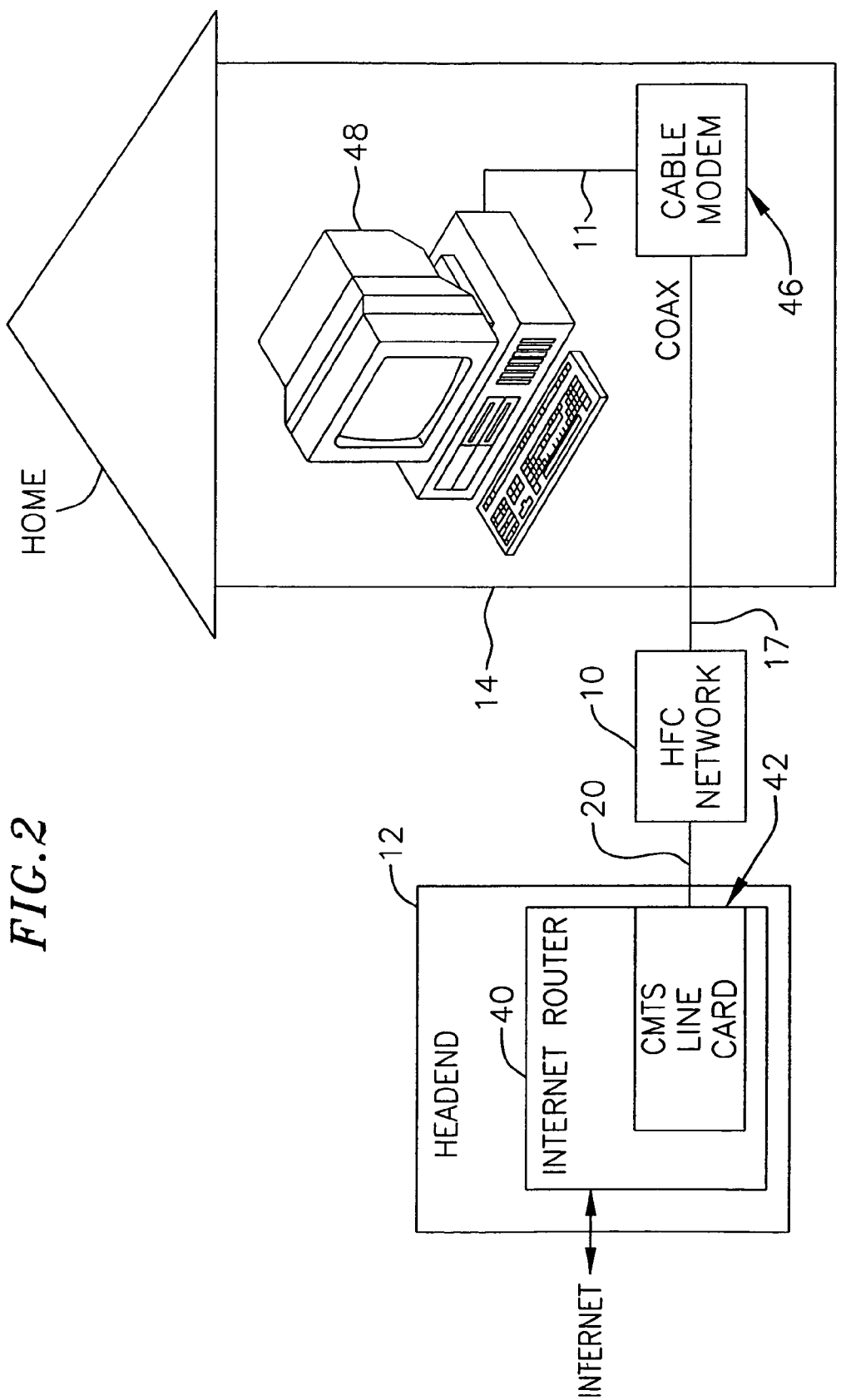
FIG. 2 is a schematic diagram of the headend and a cable modem in one home of the cable transmission system shown in FIG. 1.

Referring now to FIG. 2, a simplified block diagram shows the interconnection of the headend 12 and an exemplary home 14, wherein a cable modem 46 communicates with a cable modem termination system at headend 12, embodied as a line card 42, via hybrid fiber coaxial network (HFC) 10.

More particularly, a personal computer 48, disposed within the home 14, is connected via cable 11 to the cable modem 46 which communicates via coaxial cable 17 with the hybrid fiber coaxial network 10. Network 10 in turn communicates via optical fiber 20 with the line card or cable modem termination system (CMTS) 42 of the headend 12. Internet router 40 permits communication between the headend 12 and the Internet or any other desired device or network.

Figure 3:
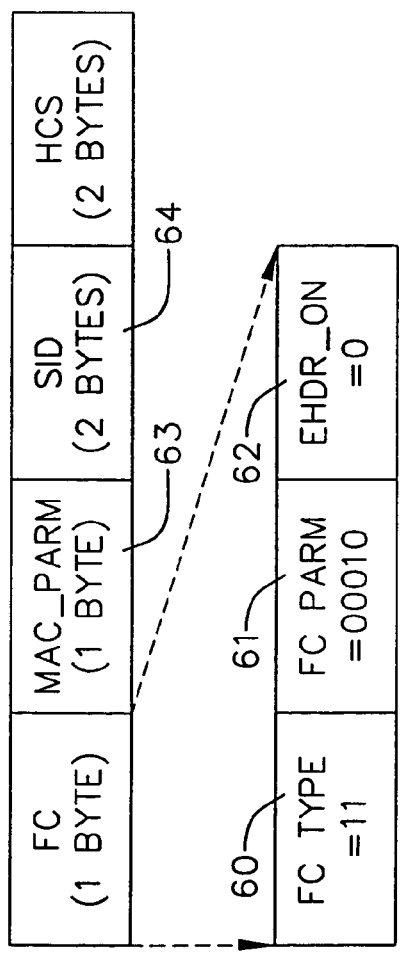
FIGS. 3 and 4 are diagrams of formats of bandwidth requests according to the DOCSIS standard.

Reference is made to FIG. 3 for a depiction of the format of one type of MAC header according to the Data-Over-Cable Service Interface Specification (DOCSIS). Specifically, FIG. 3 depicts the format of a bandwidth request. A field 60 (FC TYPE=11) identifies the header as a bandwidth request frame. A field 61 (FC PARM=00010) specifies that it is a MAC header only, i.e., there are no following data PDU's. A field 62 (EHDR_ON=0) signifies that it is not an extended header. A field 63 (MAC_PARM) specifies the number of requested time slots. A field 64 (SID) identifies the cable modem making the request. The bandwidth request format is explained in more detail in Table I, which follows:

TABLE I

| Field | Usage | Size |
| --- | --- | --- |
| FC | FC_TYPE = 11; MAC-Specific Header<br>FC_PARM[4:0] = 00010; MAC Header only; no data PDU following<br>EHDR_ON = 0; No EHDR allowed | 8 bits |
| MAC_PARM | REQ, total number of minislots requested | 8 bits |
| SID | Service ID (0 . . . 0x1FFF) | 16 bits |
| EHDR | Extended MAC Header not allowed | 0 bytes |
| HCS | MAC Header Check Sequence | 2 bytes |
| | Length of a REQ MAC Header | 6 bytes |

Figure 4:
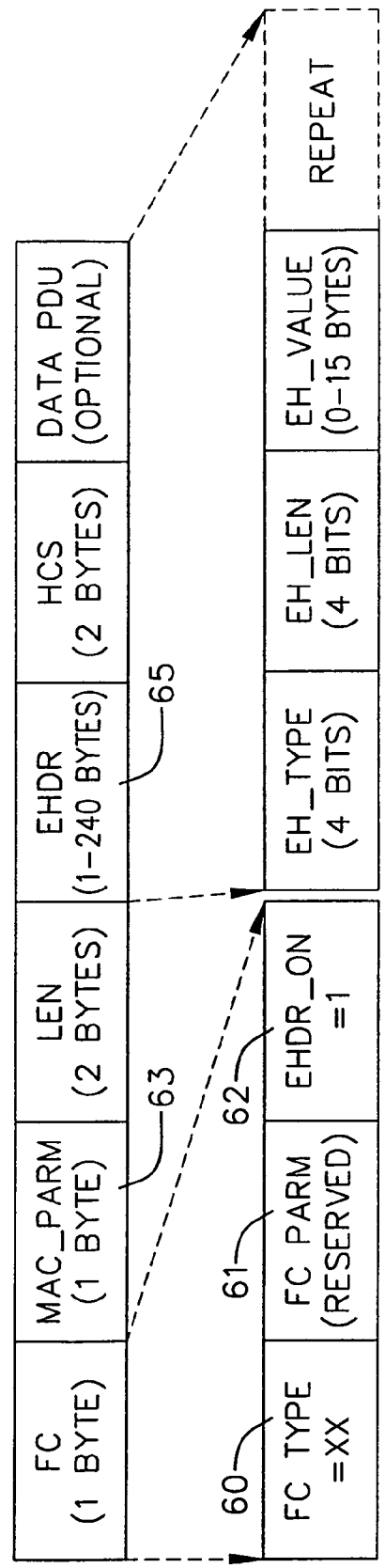

Reference is made to FIG. 4 for a depiction of another type of format of a MAC header according to the DOCSIS specification. Specifically, FIG. 4 depicts an extended header capable of carrying a so-called "piggy-back" bandwidth request. In this case, field 60 (FC_TYPE=XX) identifies the header as another type of MAC frame; field 61 (FC PARM=XXXXX) is dependent on the header type; field 62 (EHDR_ON=1) signifies that it is an extended header; and field 63 (MAC_PARM) specifies the length of the extended header plus optional data PDU in bytes. The extended header format is shown in more detail in Table II, which follows:

TABLE II

| Field | Usage | Size |
| --- | --- | --- |
| FC | FC_TYPE = XX; Applies to all MAC Headers<br>FC_PARM[4:0} = XXXXX; dependent on FC_TYPE<br>EHDR_ON = 1; EHDR present this example | 8 bits |
| MAC_PARM | ELEN = x; length of EHDR in bytes | 8 bits |
| LEN | LEN = x + y; length of EHDR plus OPTIONAL data PDU in bytes | 16 bits |
| EHDR | Extended MAC Header present this example | x bytes |
| HCS | MAC Header Check Sequence | 2 bytes |
| PDU | OPTIONAL data PDU | y bytes |
| | Length of MAC frame with EHDR | 6 + x + y bytes |

Extended header (EHDR) field 65 in FIG. 4 contains the data fields shown in Table III, which follows:

TABLE III

| EH Element Fields | Usage | Size |
| --- | --- | --- |
| EH_TYPE | EH element Type Field | 4 bits |
| EH_LEN | Length of EH_VALUE | 4 bits |
| EH_VALUE | EH element data | 0-15 bytes |

The various extended header types are shown in Table IV, which follows:

TABLE IV

| EH_TYPE | EH_LEN | EH_VALUE |
| --- | --- | --- |
| 0 | 0 | Null configuration setting; may be used to pad the extended header. The EH_LEN MUST be zero, but the configuration setting may be repeated. |
| 1 | 3 | Request: mini-slots requested (1 byte); SID (2 bytes) |
| 2 | 2 | Acknowledgment requested; SID (2 bytes) |
| 3 (=BP_UP) | 4 | Upstream Privacy EH Element |
| | 5 | Upstream Privacy with Fragmentation EH Element |
| 4 (=BP_DOWN) | 4 | Downstream Privacy EH Element |
| 5 | 1 | Service Flow EH Element; Payload Header Suppression Header |
| | 2 | Service Flow EH Element; Payload Header Suppression Header (1 byte) Unsolicited Grant Synchronization Header (1 byte) |
| 6-9 | | Reserved |
| 10-14 | | Reserved |
| 15 | XX | Extended EH Element: EHX_TYPE (1 byte), EHX_LEN (1 byte), EH_VALUE (length determined by EHX_LEN) |

As shown in Tables III and IV, extended headers with piggy back bandwidth requests are designated EH_TYPE=0001 in a field EH_TYPE, the number of requested minislots and the requesting cable modem (SID) are contained in a field EH_VALUE, and the length of the EH_VALUE field is contained in a field EH_LEN.

Figure 5:
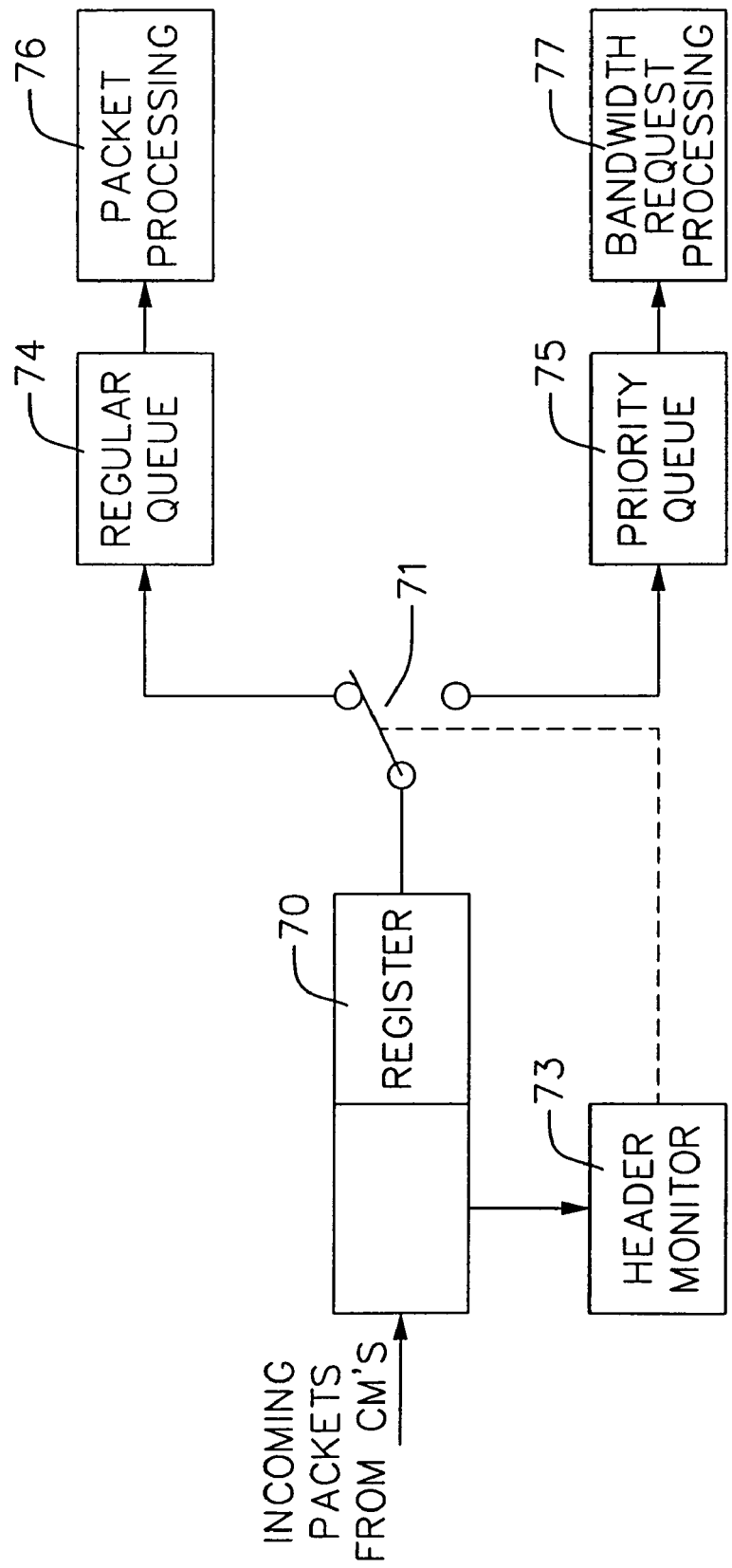
FIG. 5 is a functional block diagram illustrating how bandwidth requests are processed according to the principles of the invention.
Figure 6:
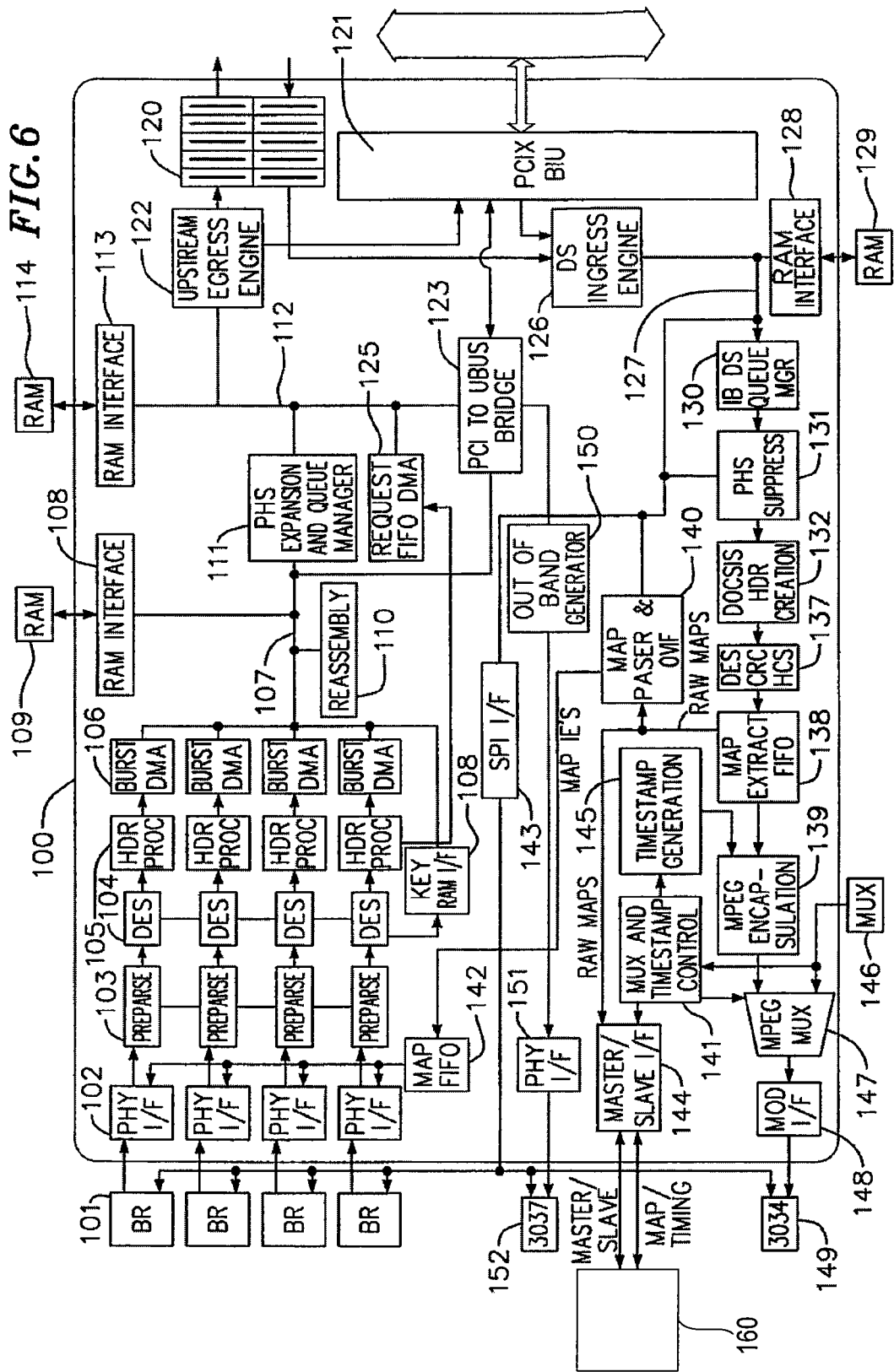
FIG. 6 is a schematic block diagram of a CMTS and a coupled slave CMTS that incorporates the invention.

Reference is made to FIG. 5, which illustrates how the invention operates to process some data types, particularly bandwidth requests received, at a CMTS out of order on a priority basis to improve the quality of service of a cable modem system. Incoming data packets received by the CMTS from cable modems are fed to a storage register 70. As represented symbolically by a switch 71 and a switch control 72, a header monitor 73 reads the header of each data packet and makes a decision whether to route the data packet to a regular queue 74 or a priority queue 75. Header monitor 73 inspects header fields 60 and 62 (FIGS. 3 and 4). If FC TYPE=11 in field 60, the packet is a bandwidth request so the entire packet is sent to priority queue 75. If EHDR_ON=1 in field 62 and EH_TYPE=0001 in field 65, the packet contains a piggy-back request so the EH_VALUE containing the number of requested minislots and the requesting cable modem (SID) and the EH_LEN containing the length of the EH_VALUE are sent to priority queue 75; the remainder of the header and the appended PDUs are sent to regular queue 74. Packet data units (PDU's) and messages other than bandwidth requests are identified by monitor 73 because neither of the conditions set forth in the preceding two sentences are present in the header; these data packet units are sent to regular queue 74. Regular queue 74 is coupled to a packet processing unit 76 and priority queue 75 is coupled to a bandwidth request processing unit 77, which generates bandwidth allocation MAPS for transmission downstream to the cable modems. Reference is made to application Ser. No. 09/57,4558 for a further description of the MAP generation process. In a typical embodiment of the invention, the packet and bandwidth request processing functions are performed by software. FIG. 6 shows a CMTS at headend 12 (FIG. 2), which incorporates the functionality described in connection with FIG. 5. In a typical embodiment, the components shown in FIG. 6 within a block 100 all reside on a single integrated circuit chip and the other component shown in FIG. 6 reside off chip 100. For the purpose of illustration, four upstream data channels are shown although more could be utilized. In each upstream data channel, a burst receiver 101 is coupled by a PHI interface 102 to a prepare unit 103. Burst receivers 101 could, for example, be BCM3138 burst receivers marketed by Broadcom Corporation. As described in application Ser. No. 09/574,558, data is transferred between burst receivers 101 and PHY interfaces in both directions. Preparse units 103 inspect the header of each packet to determine if encryption was applied to the packet. Each preparse unit 103 is coupled by a decryptor (DES) unit 104 to a header processor 105. If encryption was applied to a packet the packet is decrypted in unit 104. A key RAM interface unit 110 is connected from DES unit 104 to U-bus 107 for this purpose. Each header processor 105 is coupled by a burst DMA unit 106 to an upstream U-bus 107. U-bus 107 is coupled by a RAM interface 108 to an external, i.e., off-chip, RAM 109, in which reassembly queues and DES keys are stored. Burst DMA unit 106 assigns addresses to data packets stored in RAM 109, checks the CRC, and adds control data to the data packets stored in RAM 109 based on the header data. It also retrieves DES keys from RAM 109 response to key RAM interface unit 110. A temporary reassembly memory engine 110 is also connected to upstream U-bus 107. Reassembly engine 110 stores the received parts of fragmented data while the fragmented data is being reassembled into a PDU. Reference is made to application Ser. No. 09/574,558 for a description of the fragmentation process. A PHS expansion and queue manager 111 connects upstream U-bus 107 to an upstream U-bus 112. Reference is made to application Ser. No. 09/652,861, filed on even date herewith by John D. Horton, Jr., entitled "Method and Apparatus for the Suppression of Packet Headers" for a more detailed description of the PHS expansion process. U-bus 112 is connected by a RAM interface 113 to an external RAM 114 in which PHS rules, output queues, and MIBs are stored. Reassembly unit 110 and manager 111 convert the data in the PDUs into standard ethernet format and send such data via U-bus 112 to RAM 114 until such data is called by an upstream egress engine 122.

Chip 100 has two data ports. One data port is a packet port 120 for exchanging PDUs with an ethernet network. The other data port is a PCIX bus interface unit (BUI) 121 through which data is exchanged with an external, i.e., off-chip processor (not shown). Thus, data stored in RAMs 109 and 114 is sent to and from the external processor through interface 121. The external processor performs the MAC functions described in application Ser. No. 09/574,558 and in the DOCSIS specification. Upstream egress engine 122 feeds PDUs to packet port 120 and data messages to PCIX port 121 for transmission to the external processor. U-bus 107 is coupled to PCIX port 121 by a PCI-to-U-bus bridge 123 so as to form a control path between U-bus 112 and PCIX port 121. Header processors 105 are each coupled to a request FIFO DMA unit 125, which is in turn coupled by U-bus 112 to RAM 114. Unit 125 assigns addresses in RAM 114 for storage of the bandwidth requests in a queue until the bandwidth requests are sent to the external processor to generate the bandwidth allocation MAPS and sends these addresses to the external processor via bridge 123.

PCIX port 121 and packet port 120 are coupled by a downstream ingress engine 126 to a downstream U-bus 127. A RAM interface 128 couples U-bus 127 to an external RAM 129, which stores downstream priority queues, packet header suppression rules, and DES keys and to an in-band downstream queue manager 130. Queue manager 130 is coupled by a packet header suppression unit 131 to a DOCSIS header creation unit 132. For a description of header suppression unit 131 reference is made the previously mentioned application Ser. No. 09/652,861. DES, CRC, and HCS are appended to the data packets in a unit 137. Unit 137 is coupled by a map extractor FIFO 138 to a MPEG encapsulation unit 139 for transmission in the downstream in-band data channel.

In the usual mode of operation, upstream egress engine 122 and downstream ingress engine 128 control the transmission of the data they process independent of the external processor.

A copy of the MAPs in FIFO 138 is also made for use in the CMTS. The MAP copies are coupled to a MAP parser and overflow interface 140, which filters out what is not needed for use in the CMTS, leaving only the MAP information elements (IEs) needed in the CMTS to process signal burst received from the cable modems. These IEs are fed to a MAP FIFO 142. If there are too many IEs to store in MAP FIFO 142, the overflow is stored temporarily in RAM 129 for later retrieval. This gives the processor more flexibility to generate MAPs when the processing time is available. MAP FIFO 142 is coupled to PHY interfaces 102 to feed the IEs thereto. The IEs assist in identifying and demodulating the signal bursts received by burst receivers 101 as described in application Ser. No. 09/574,558. U-bus 127 is also coupled by an SPI interface 143 to each burst receiver 101. Burst receiver configuration information is sent through interface 143 to burst receivers 101 to configure them for receipt of data transmitted by the cable modems as described in application Ser. No. 09/574,558.

Reference is made to application Ser. No. 09/653,155 (now U.S. Pat. No. 6,760,316) filed by Anders Hebsgaard on even date herewith, entitled "Method and Apparatus for the Synchronization of Multiple Cable Modem Termination Devices" for a detailed description of a plurality of CMTS chips connected together so the same MAP information is shared by all the CMTS chips and all the CMTS chips are synchronized to a master clock in one of the CMTS chips which is designated as a master CMTS. To this end, MAP extractor FIFO 138 is also coupled to a master/slave interface unit 144 to send copies of the MAPs to slave CMTS chips such as slave CMTS 160. An external master clock (not shown) is coupled to a MUX and timestamp control unit 141, which is connected to a timestamp generation unit 145. Unit 141 is coupled to interface unit 144 to send timestamps to the slave CMTS chips to synchronize their operation to the master clock. Generation unit 145 is coupled to an encapsulation unit 139 to embed time stamps in the in-band downstream data flow.

An external multiplexer 146 is fed to one input of an MPEG multiplexer 147. Encapsulation unit 139 is fed to the other input of multiplexer 147. Multiplexer 147 is coupled by a modulator interface 148 to an external downstream modulator 149, which could be, for example, a BCM3034 modulator marketed by Broadcom Corporation. Other content such as graphics overlays could be introduced at the headend through multiplexer 146. To this end, multiplexer 146 is coupled to control unit 141 to coordinate the merger of data from multiplexer 146 with the data from encapsulation unit 139. Control unit 141 is connected to multiplexer 147 to control the selection of its inputs so only one input is transmitted to modualtor interface 148. SPI interface 143 is also coupled to modulator 149 to supply configuration data thereto such as the modulation type (e.g., QAM and symbol rate). Bridge 123 is coupled by an out-of-band generator 150 and a PHY interface 151 to a out-of-band transmitter 152, which could be for example, a BCM3037 modulator marketed by Broadcom Corporation. SPI interface 143 is also coupled to transmitter 152 to supply configuration data thereto. Reference is made to application Ser. No. 09/654,109, filed by Thomas J. Quigley on even date herewith, entitled "Method and Apparatus for Latency Reduction in Low Power Two Way Communication Equipment Applications in Hibrid Fiber Cable Plants" for a detailed description of the out-of-band channel and its uses.

What is claimed is:

1. A cable modem termination system (CMTS), comprising:
   a receiver that receives data communications from one or more cable modems over a network;
   processing logic coupled to the receiver, the processing logic configured to process data communications that comprise bandwidth requests out-of-order with respect to an order in which the data communications were received by the receiver;
   a first memory queue coupled to the processing logic; and
   a second memory queue coupled to the processing logic;
   wherein the processing logic analyzes the data communications received over the network to determine whether the data communications comprise bandwidth requests and wherein the processing logic routes data communications that comprise bandwidth requests to the first memory queue and routes data communications that do not comprise bandwidth requests to the second memory queue.

2. The CMTS of claim 1, wherein the processing logic is configured to process a data communication that comprises a bandwidth request ahead of an earlier-received data communication that comprises a packet data unit.

3. The CMTS of claim 1, wherein the receiver comprises a burst receiver.

4. The CMTS of claim 1, wherein the processing logic analyzes a header field associated with each data communication to determine whether the data communication comprises a bandwidth request.

5. The CMTS of claim 1, further comprising:
   a storage register that stores data communications from the receiver;
   wherein the storage register is accessible by the processing logic for analyzing the data communications stored therein.

6. The CMTS of claim 1, further comprising:
   a bandwidth request processing unit coupled to the first memory queue, the bandwidth request processing unit configured to process bandwidth requests stored in the first memory queue to generate bandwidth allocation messages for transmission to the one or more cable modems.

7. The CMTS of claim 6, further comprising:
   a transmitter that transmits the bandwidth allocation messages to the one or more cable modems over the network.

8. The CMTS of claim 7, further comprising:
   a bandwidth allocation storage unit, wherein bandwidth allocation information from said bandwidth allocation messages are stored and are accessible to the receiver.

9. The CMTS of claim 7, further comprising:
   a master/slave interface unit configured to send bandwidth allocation information from said bandwidth allocation messages to one or more slave cable modem termination systems.

10. The CMTS of claim 1, further comprising:
    a packet processing unit coupled to the second memory queue, the packet processing unit configured to process data packets stored in the second memory queue.

11. The CMTS of claim 1, further comprising:
    a decryptor device configured to decrypt incoming encrypted data communications, wherein the decryptor device is coupled to the receiver and to the processing logic; and
    a key interface wherein the key interface is coupled to the decryptor, and is configured to provide keys for decrypting said incoming encrypted data communications.

12. The CMTS of claim 1, further comprising:
    a reassembly device coupled to the receiver, wherein the reassembly device is configured to store received parts of a fragmented data communication, and wherein the processing logic is further configured to reassemble the parts of the fragmented data communication.

13. The CMTS of claim 1, wherein the processing logic is further configured to generate bandwidth allocations based on the data communications, and to transmit the bandwidth allocations to at least one of the cable modems.

14. A method, comprising:
    receiving data communications from one or more cable modems over a network; and
    processing, using at least one processor, data communications that comprise bandwidth requests out-of-order with respect to an order in which the data communications were received,
    wherein processing data communications that comprise bandwidth requests out-of-order with respect to an order in which the data communications were received comprises:
    analyzing the data communications received over the network to determine whether the data communications comprise bandwidth requests;
    routing data communications that comprise bandwidth requests for storage in a first memory queue; and
    routing data communications that do not comprise bandwidth requests for storage in a second memory queue.

15. The method of claim 14, wherein processing data communications that comprise bandwidth requests out-of-order with respect to an order in which the data communications were received comprises:
    processing a data communication that comprises a bandwidth request before processing an earlier-received data communication that comprises a packet data unit.

16. The method of claim 14, wherein analyzing the data communications received over the network to determine whether the data communications comprise bandwidth requests comprises analyzing a header field associated with each data communication.

17. The method of claim 14, further comprising:
    storing the data communications received over the network in a storage register prior to the analyzing step.

18. The method of claim 14, further comprising:
    processing bandwidth requests stored in the first memory queue to generate bandwidth allocation messages for transmission to the one or more cable modems.

19. The method of claim 18, further comprising:
    transmitting the bandwidth allocation messages to the one or more cable modems over the network.

20. The method of claim 19, further comprising:
    transmitting bandwidth allocation information from the bandwidth allocation messages to one or more slave cable modem termination systems.

21. The method of claim 14, further comprising:
    processing data packets stored in the second memory queue.

22. A cable modem system, comprising:

a plurality of cable modems; and a cable modem termination system (CMTS) communicatively connected to the plurality of cable modems over a network, the CMTS comprising:

a receiver that receives data communications from the plurality of cable modems over the network;

processing logic coupled to the receiver, the processing logic configured to process data communications that comprise bandwidth requests out-of-order with respect to an order in which the data communications were received by the receiver;

a first memory queue coupled to the processing logic; and a second memory queue coupled to the processing logic;

wherein the processing logic analyzes the data communications received over the network to determine whether the data communications comprise bandwidth requests and wherein the processing logic routes data communications that comprise bandwidth requests to the first memory queue and routes data communications that do not comprise bandwidth requests to the second memory queue.

23. The cable modem system of claim 22 wherein the CMTS is configured to process a data communication that comprises a bandwidth request ahead of an earlier-received data communication that comprises a packet data unit.

24. The cable modem system of claim 23 further comprising one or more slave cable modem termination systems that are communicatively coupled to the cable modem termination system, wherein the slave cable modem termination systems receive bandwidth allocation information from the cable modem termination system, and wherein the bandwidth allocation information is based on bandwidth allocation messages transmitted by the cable modem termination system to the plurality of cable modems.

* * * * *